United States Patent [19]

Jones et al.

[11] Patent Number: 4,955,195

[45] Date of Patent: Sep. 11, 1990

[54] FLUID CONTROL CIRCUIT AND METHOD OF OPERATING PRESSURE RESPONSIVE EQUIPMENT

[75] Inventors: Marvin R. Jones, Houston; Joseph L. LeMoine, Brookshire, both of Tex.

[73] Assignee: Stewart & Stevenson Services, Inc., Houston, Tex.

[21] Appl. No.: 287,180

[22] Filed: Dec. 20, 1988

[51] Int. Cl.[5] ............................................ F16D 31/02

[52] U.S. Cl. ........................................ 60/405; 60/413; 60/416; 137/1; 91/29; 91/32; 91/33; 91/418; 91/420

[58] Field of Search ........................ 60/416, 413, 405; 417/222, 223, 224, 225, 226, 227; 137/1.1, 1.2, 1.3; 91/19, 29, 32, 33, 418, 420, 424, 462

[56] References Cited

U.S. PATENT DOCUMENTS

| | | | |
|---|---|---|---|
| 3,763,744 | 10/1973 | Fournell et al. | 91/32 |
| 3,802,318 | 4/1974 | Sibbald | 91/32 |
| 4,007,826 | 2/1977 | Brown, Jr. et al. | 91/32 |
| 4,036,106 | 7/1977 | Athy, Jr. | 91/420 |
| 4,142,368 | 3/1979 | Mantegani | 91/420 |
| 4,236,695 | 12/1980 | Morrison | 91/32 |
| 4,317,557 | 3/1982 | Orr | 251/1.3 |
| 4,349,041 | 9/1982 | Bates | 251/1.3 |
| 4,413,642 | 11/1983 | Smith et al. | 251/1.1 |
| 4,509,405 | 4/1985 | Bates | 251/1.2 |
| 4,614,148 | 9/1986 | Bates | 251/1.1 |

FOREIGN PATENT DOCUMENTS

| | | | |
|---|---|---|---|
| 0029583 | 3/1977 | Japan | 91/32 |
| 0039773 | 3/1979 | Japan | 91/33 |
| 0806911 | 2/1981 | U.S.S.R. | 91/420 |
| 0962597 | 10/1982 | U.S.S.R. | 251/1.1 |
| 1270293 | 11/1986 | U.S.S.R. | 251/1.1 |
| 2170330 | 7/1986 | United Kingdom | 251/1.1 |

*Primary Examiner*—Edward K. Look
*Assistant Examiner*—Thomas Denion
*Attorney, Agent, or Firm*—Fulbright & Jaworski

[57] ABSTRACT

A fluid control circuit and method of operating equipment such as a blowout preventer having a two-way hydraulic piston and cylinder assembly. The circuit includes various features such as a dual pressure level independently controlled fluid supply, a dedicated secondary fluid supply reserved for supplemental use, a dedicated fluid supply reserved for exclusive use in one operating branch, automatic sensor for applying a reserve fluid supply on a sensed demand, a pressure intensifier for increasing available operating force, and control circuitry for preventing loss of enhanced secondary operating energy into a primary circuit.

18 Claims, 6 Drawing Sheets

FLUID CONTROL CIRCUIT AND METHOD OF OPERATING PRESSURE RESPONSIVE EQUIPMENT

BACKGROUND OF THE INVENTION

The present invention is generally directed to a fluid control circuit and method of operating pressure responsive equipment in which the equipment normally requires a low initial force requirement which, during its cycle of operation, increases substantially. Hydraulically operating forging presses represent one class of such equipment. That is, at the beginning of a forging stroke, the volume of material in the billet undergoing plastic strain is relatively small. Towards the end of the stroke and as the material more completely fills the forging die, the volume of material undergoing plastic strain increases greatly and, in consequence, the force requirement for operating the forge increases.

Another type of equipment are blowout preventers which are conventionally equipped with ram-type preventers with blind-shear rams. Such rams include cutting blades which are used in emergencies to sever a drill pipe. At other times, the blind-shear rams function as ordinary blind rams. In the pipe shearing operation, the rams require minimal operating force until their cutting edges contact the pipe to be cut. As the pipe begins to collapse, the force needed to move the rams inwardly increases rapidly to a maximum during the actual pipe cutting.

However, in the past the control and operating circuits for such equipment have been subject to various problems. For example, pressure responsive equipment such as forging presses and blowout preventers have typically used pressure accumulators for storing and providing the necessary operating power. However, because the accumulators discharge in a relatively rapid manner, the accumulators can supply maximum force at the time of minimum need, but only minimum force at the time of maximum need. Various features of the present invention are the provision of a dedicated secondary fluid supply reserved for supplementary use and/or a dedicated fluid supply reserved for exclusive use in a branch circuit, automatic means for applying the reserve fluid supply upon a sensed demand, independently operable means for supplying fluid pressure at a plurality of fluid levels to a pressure responsive equipment, a circuit and control means for supplying higher operating force when required, and means for preventing loss of enhanced secondary operating energy into a primary operating circuit.

SUMMARY

One feature of the present invention is the provision of a control circuit for supplying fluids to a pressure responsive valve operator which includes a fluid supply, a first control valve connected between the fluid supply and the valve operator for actuating the valve operator, a pressure regulator connected to the fluid supply, and a second control valve connected between the pressure regulator and the valve operator for actuating the valve operator with a lesser pressure than with the first control valve. This feature is particularly advantageous in a blind-shear blowout preventer in which the rams may function as an ordinary blind ram without using the force required to operate the cutting blades, thereby prolonging the service life of the ram packings. That is, the first control valve may be actuated to sever pipe with the use of the unregulated higher force, while the second control valve only uses the lower regulated pressure for closing the blind rams.

Another object of the present invention is wherein the pressure responsive valve operator includes a double acting piston cylinder assembly, the control valves are each connected to the assembly to alternately actuate one side of the piston while venting fluid from the second side of the piston and selector valve means is connected between each side of the piston and each of the control valves.

The selector valves means may include a first selector check valve connected between one side of the assembly and each of the first and second control valves, and a second selector check valve connected between the second side of the assembly and each of the first and second control valves.

Another feature of the present invention is the provision of a control circuit for supplying fluids to a pressure responsive valve operator which include a primary fluid supply and a control valve connected between the primary fluid supply and the valve operator for actuating the valve operator. An accumulator is charged with pressurized fluids for providing a secondary fluid supply, and valve means are connected between the accumulator and the pressure responsive valve means for supplying the pressurized fluid in the accumulator to the valve operator, but only when needed. This feature provides a dedicated secondary fluid supply reserved for supplementary use in the control system. The accumulator may be charged with fluid from the primary fluid supply or may have an independent fluid supply and/or may be charged at other pressure levels.

Another further object of the present invention is wherein the valve means may include a differential pressure, pilot-operated valve, having a first pilot pressure inlet connected to the primary fluid supply and a second pilot pressure inlet connected to the valve operator.

Another feature of the present invention is the provision of a control circuit for supplying fluids to a pressure responsive valve operator having a double acting piston and cylinder assembly and including a primary fluid supply, a first control valve connected between the fluid supply and both sides of the piston and cylinder assembly, a pressure regulator connected to the fluid supply, and a second control valve connected between the pressure regulator and both sides of the piston and cylinder assembly. An accumulator is charged with pressurized fluid, and valve means connected between the accumulator and the valve operator supplies the pressurized fluid in the accumulator to the valve operator when the pressure on the assembly is equal to the pressure in the primary fluid supply.

Another further object is the provision of a pilot operated check valve connected to one side of the pressure responsive valve operator, and a control line connected between the pilot of the check valve and the second side of the pressure responsive valve operator for opening the check valve in response to pressure on the second side.

Still another feature of the present invention is the provision of a control circuit for supplying fluids to a pressure responsive valve operator having a double acting piston and cylinder assembly and including a fluid supply, a first control valve connected between the fluid supply and both sides of the piston and cylinder assembly, a pressure regulator connected to the fluid supply, a second control valve connected between the pressure regulator and both sides of the piston and cylinder assembly. A pressure intensifier is connected between the fluid supply and one side of the piston and cylinder assembly, and valve means is connected to the inlet of the intensifier for actuating the intensifier for supplying higher pressure fluids to the assembly when the pressure on the one side of the assembly is equal to the pressure in the fluid supply.

A still further object of the present invention is a control circuit having a primary fluid supply, a control valve connected between the fluid supply and the hydraulic piston and cylinder assembly of a pressure responsive valve operator for moving the operator towards the closed position, and a pressure intensifier having an inlet and an outlet, in which the outlet is connected to the hydraulic piston and cylinder assembly. An accumulator provides a secondary fluid supply, and has an output connected to the input of the intensifier. Valve means between the intensifier and the accumulator connected the pressure in the accumulator to the intensifier when the flow rate to the piston and cylinder assembly approaches zero.

Yet a further feature of the present invention is a provision of a control circuit for controlling a plurality of blowout preventers, including a pressure accumulator having an output connected to and providing fluid power to each of the blowout preventers, the output of said accumulators being dedicated to and connected to only a single blowout preventer. This circuitry provides exclusive control and operating circuits which conserve the fluids of dedicated accumulators until they are needed.

Other and further objects, features, and advantages will be apparent from the following description of presently preferred embodiments of the invention, given for the purpose of disclosure and taken in conjunction with the accompanying drawings.

DESCRIPTION OF THE PREFERRED EMBODIMENT

While the present invention will be described as an apparatus and method for operating a blowout preventer having blind-shear rams, for purposes of illustration only, it will be understood that the present invention can be used with other types of pressure responsive equipment. In addition, while the control circuit will be described in connection with the use of hydraulic fluids, other types of fluids such as gasses may be utilized.

Figure 1:
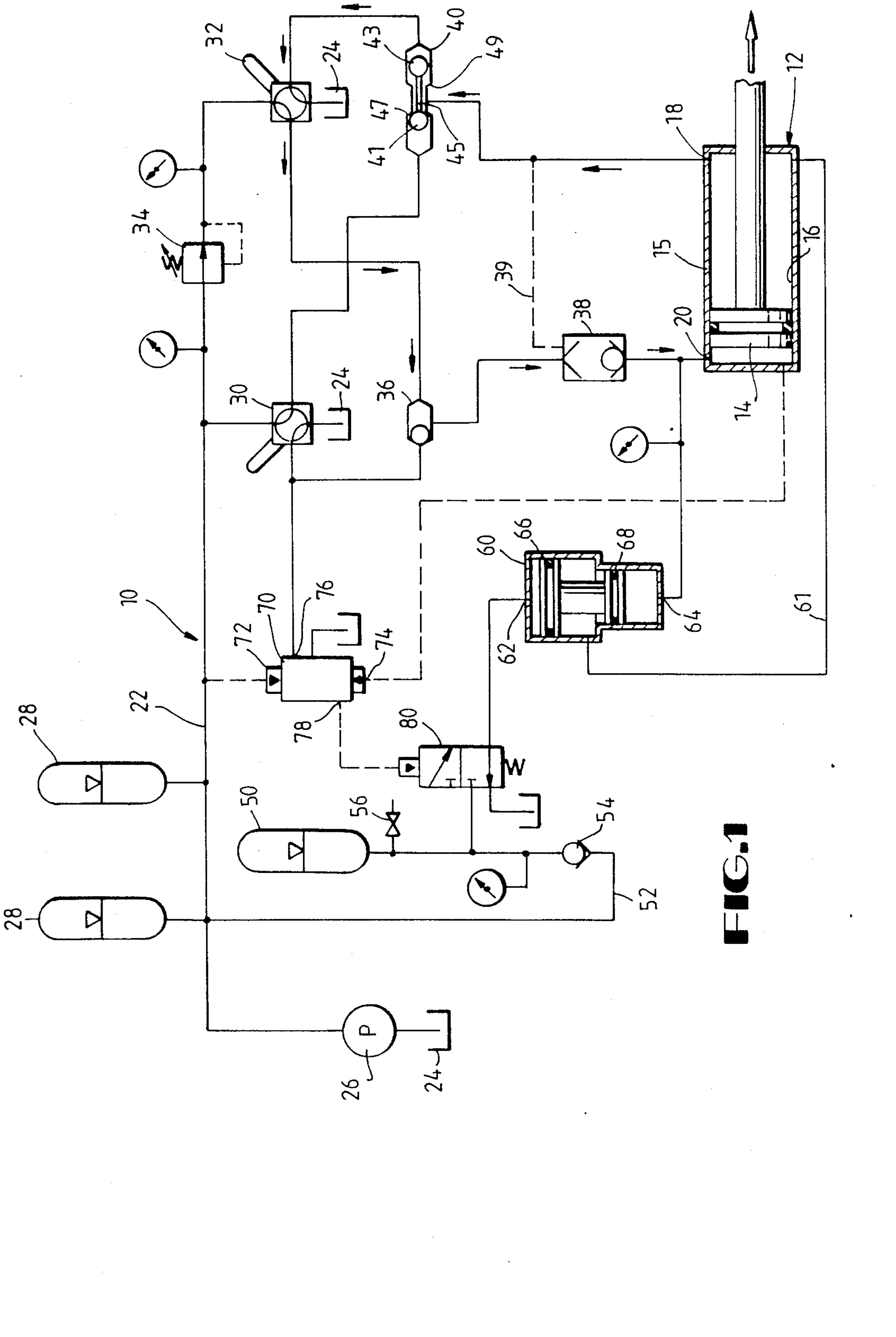
FIG. 1 is a schematic diagram of a fluid control circuit of the present invention for operating a blowout preventer and is shown in position for closing blind-shear rams.

Referring now to FIG. 1, the reference numeral 10 generally indicates the fluid control circuit of the present invention for operating a blowout preventer such as a blowout preventer generally indicated by the reference numeral 12, having a two-way piston and cylinder assembly 15, including a piston 14 movable in a cylinder 16. The cylinder 16 includes an open port 18 for admitting fluid into the cylinder 16 for moving the blowout preventer 12 to the open position and a close port 20 for admitting fluid into the cylinder 16 for moving the piston 14 to a closed position. It will be understood that only one side of the blowout preventer 12 is shown as a blowout preventer is conventional and would include another piston and cylinder assembly on the opposite side of a well. Blowout preventer 12 may include various types of closing means such as blind-shear rams, and pipe rams.

A hydraulic fluid supply 22 is provided, for example, at 2600 psi. A supply 22 may include a fluid reservoir 24 from which fluid is pumped by pump 26 to the desired pressure and supplied to one or more primary accumulators 28 for storing the fluid supply under pressure.

A first control valve 30 and a second control 32 are provided, which are conventional four-way valves, either of which can transmit hydraulic fluid from the line 22, to either the open port 18 or the close port 20 of the hydraulic piston and cylinder assembly 15. A pressure regulator 34 is provided, connected between the supply 22 and the valve 32, for reducing the supply pressure, for example, to 1500 psi. The valve 30 supplies fluid at a high pressure, in the example 2600 psi, for the purpose of shearing pipe, while the valve 32 applies closing fluid, in the example given of 1500 psi for closing the preventer 12 as a blind ram. The use of the lower regulated fluid pressure avoids excessive force and, therefore, prolongs the service life of ram front packings by preventing unnecessary attrition of the packing elements on the blowout preventer. That is, the first control valve 30 can supply unregulated pressure to the blind-shear ram blowout preventer 12 to shear pipe while the second control valve 32 can supply regulated closing pressure to the blind-shear ram 12 when used as a blind ram.

Referring now to FIG. 1, the first valve 30 is shown in the off position and the second valve 32 is shown in the ram close position. In this case, the regulated control fluid passes through the valve 32, through a check selector valve 36, through a pressure piloted operated check valve 38 to the close port 20 of the blowout preventer 12 for closing the blowout preventer 12 as a blind ram. In this case, fluid will flow out of the cylinder 16 through the open port 18, through the inverse selector check valve 40, through the control valve 32, and back to the reservoir 24. The selector check valve 36 connects its outlet to the highest pressure inlet and blocks the third port. The inverse selector valve 40 provides two check valve element, which are interconnected by slidable stem 45, and seat on seats 47 and 49, respectively. In FIG. 1, high pressure through the first valve 30 shifts the check valve 40 to connect the output from the open portion 18 through the second valve 32.

Figure 2:
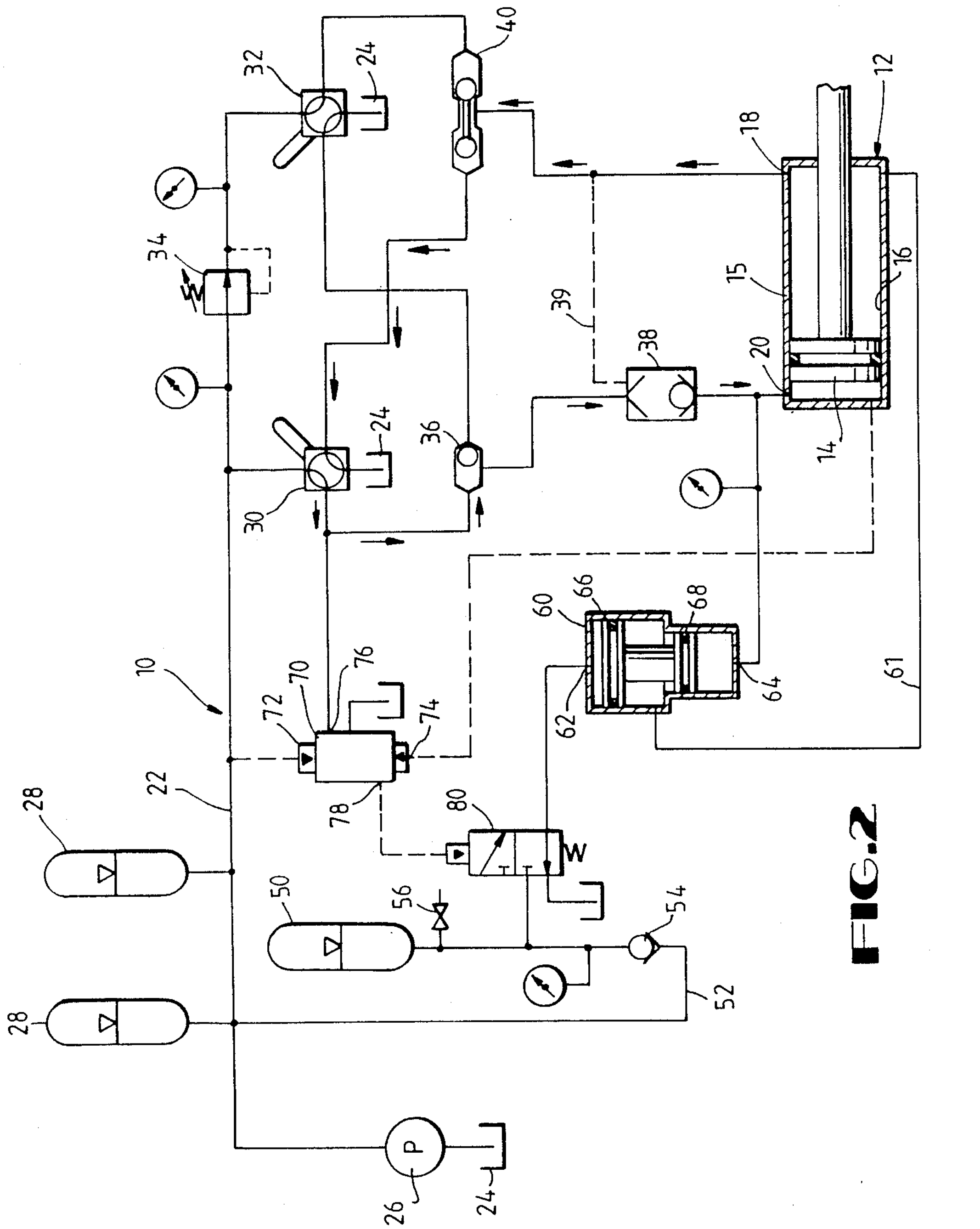
FIG. 2 is a schematic diagram of the control circuit of FIG. 1, but shown in position operating the blind-shear rams in the shear mode, but before the rams stall.

Referring now to FIG. 2, the first control valve 30 is shown in the shear ram close position and the second control valve 32 is shown in the off position. The first control valve 30 controls the shear function of the blowout preventer ram 12, independently of the valve 32, and the higher fluid pressure through the valve 30 would override the regulated pressure supplied through the valve 32 if its were in the ram close position. As shown in FIG. 2 and the arrows thereon, the unregulated pressure flowing through valve 30 passes through the selector check valve 36, the pilot operated check valve 38 and to the close port 20 of the blowout preventer 12. Fluid forced out of the outlet port 18 flows through the inverse selector valve 40, through the first control valve 30, and to the reservoir 24.

Figure 4:
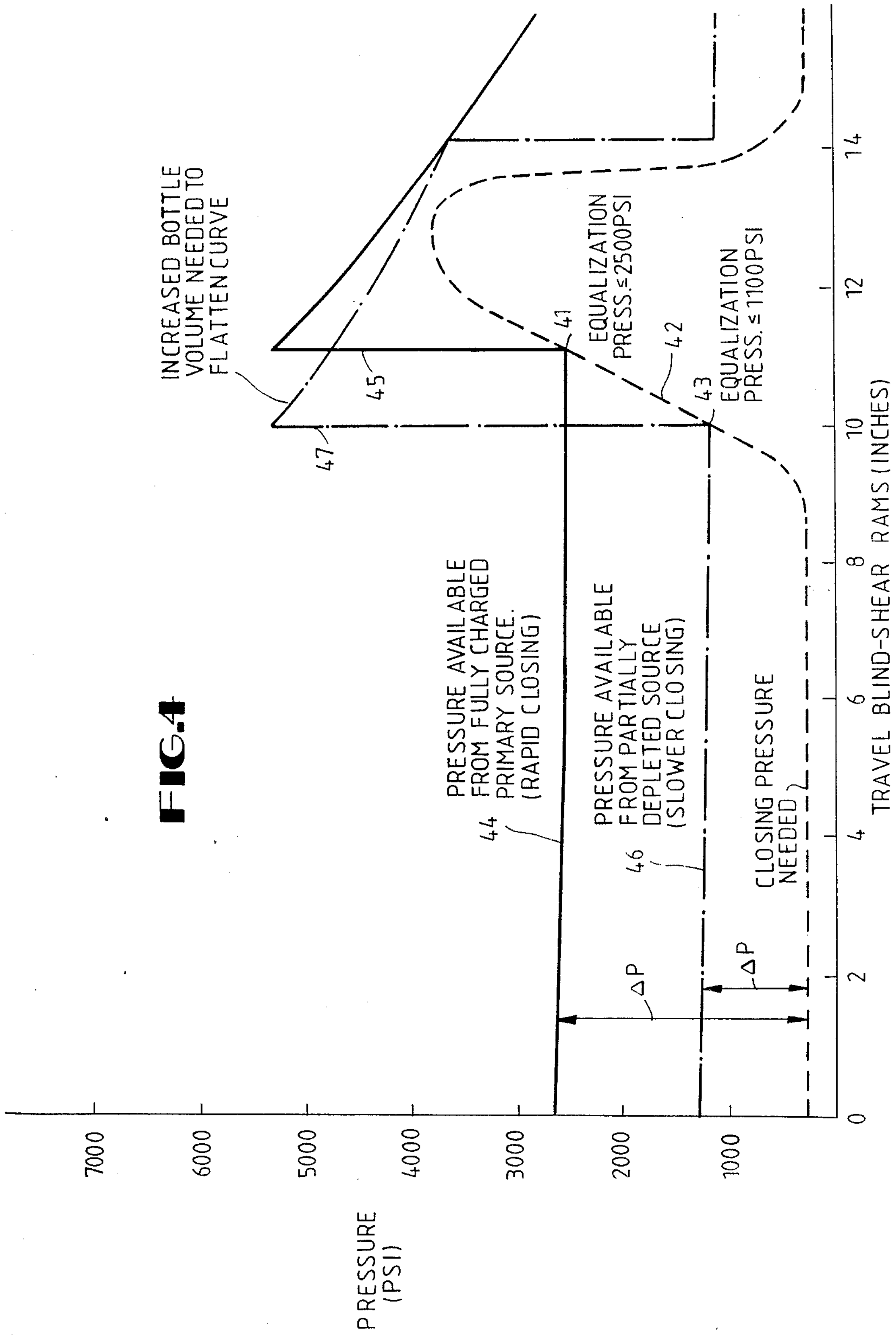
FIG. 4 is a graph illustrating an example of various closing pressures needed versus the travel of blind-shear rams, as well as pressure obtained from the control circuit of the present invention.

Referring now to FIG. 4, a graph 42 indicates the closing pressure needed to actuate a blind-shear ram 12 versus its distance of travel. It is noted in the example given that approximately 3800 psi of pressure is needed to shear the pipe by the rams 12. However, the fully-charged pressure available in the fluid supply line 22 in the example given, as shown by the graph 44, is approximately 2600 psi, and is not sufficient to supply the needed pressure to allow the rams 12 to shear the pipe. Furthermore, if the accumulators 28 have been partially depleted, the unregulated pressure in line 22 may be as shown in graph 46, which is approximately 1100 psi. Therefore, another feature of the present invention is the provision, if the pressure in line 22 is not sufficient, of a dedicated secondary fluid supply reserved for supplementary use in the control circuit 10 and/or a pressure intensifier to boost or intensify fluid pressure for shearing pipe by the blowout preventers 12.

One feature of the present invention is the provision of a separate or dedicated accumulator capacity, such as accumulator 50, which provides a secondary fluid supply which is available for shearing drillpipe by the blowout preventer 12. The advantage of the dedicated accumulator 50 is that it ensures that a power source is readily available when it is needed. It provides a reserve which is always ready for shearing, even though the main fluid accumulators 28 may be partially depleted, thereby insuring that a minimum force is available under emergency conditions.

Figure 3:
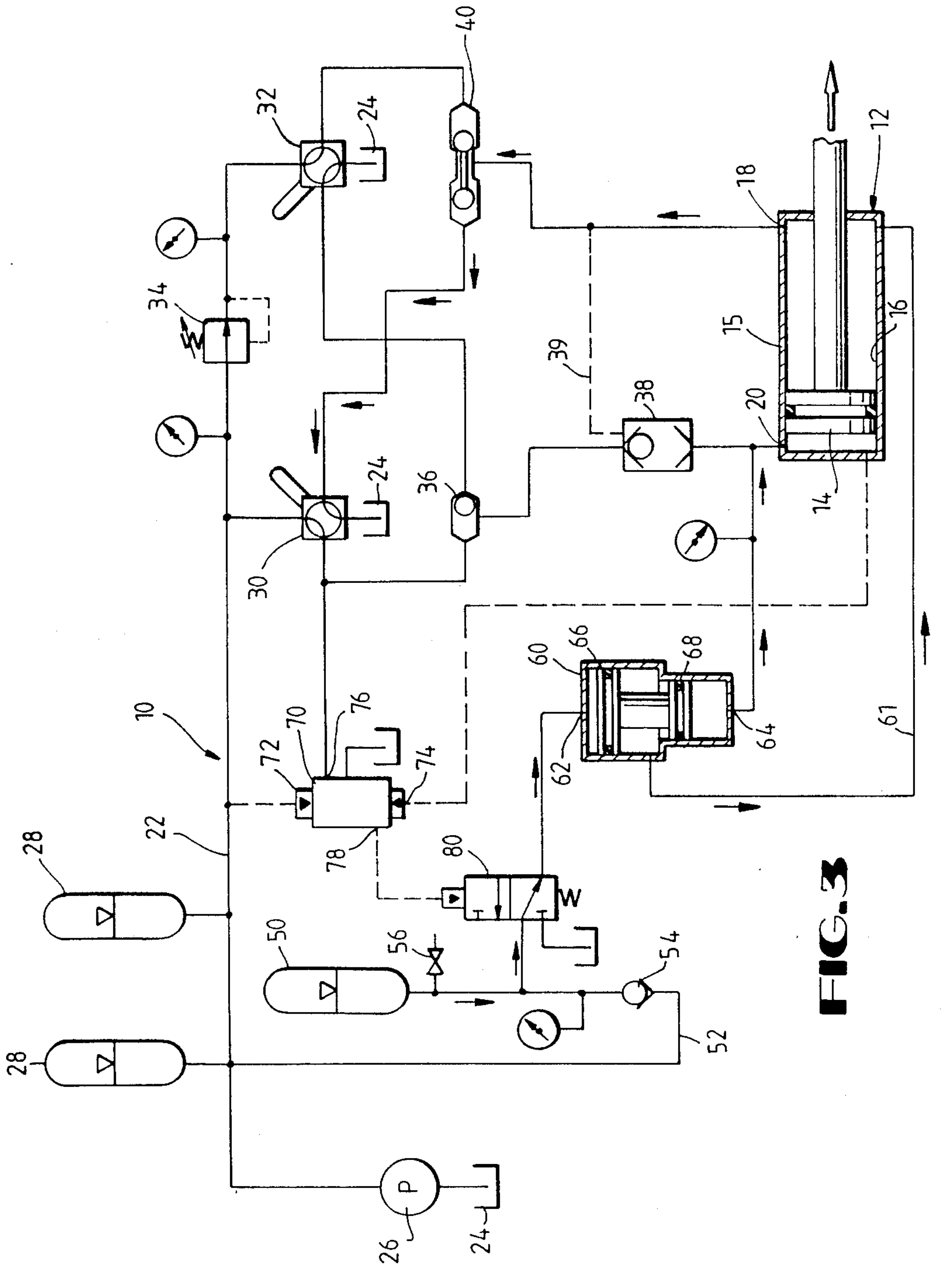
FIG. 3 is a schematic diagram of the control circuit of FIGS. 1 and 2, illustrating the circuitry after the rams stall.

Referring to FIG. 3, the accumulator 50 may be connected by a line 52, through a check valve 54, to the fluid supply 22, to precharge and recharge the accumulator 50 to the pressure in the line 22. However, as an alternative, the accumulator 50 may be charged from an independent supply source through valve 56 and may be charged at pressure levels different from and greater than the pressure in fluid supply 22. For example, in the absence of an intensifier, the accumulator would need sufficient pressure and volume to provide the pressures shown in graphs 45 and 47 (FIG. 4), respectively, for a fully charged or partially depleted primary source 28, in order to shear pipe.

If the pressure in the secondary fluid supply in accumulator 50 is sufficient, it can be applied directly to the closing port 20 for shearing the pipe. However, if the pressure in the accumulator 50 is not sufficient to satisfy the requirement 45 or 47, as the case may be in FIG. 4, a pressure intensifier 60 may be provided. The pressure intensifier 60 is provided with an inlet 62 and an outlet 64 and may include a first piston 66, which is connected to a second smaller piston 68, each of which move in separate cylinders. The pressure intensifier increases pressure at the outlet 34 in response to pressure applied to the inlet 62.

However, it is desirable to save the supply of fluid pressure in the dedicated accumulator 50 until the fluid supply line 22 has actuated the blowout preventer 12 as far as possible. That is, it is desirable to conserve the dedicated energy in the accumulator 50 and to release it automatically on demand, as indicated by sensing the equipment operating conditions. This feature can reduce the volume requirements for the accumulator 50 and assure effective use of the dedicated fluids therein.

Therefore, valve means are provided between the accumulator 50 and the intensifier 60 for connecting the pressure in the accumulator 50 to the intensifier 60 when the flow of fluid from the fluid supply 22 to the close port 20 approaches zero. This occurs when the blowout preventer ram 12 stalls and when the pressure at the close port 20 is substantially equal to the pressure in the primary fluid supply 22. Thus, a differential pilot operated valve 70 is provided, having one pilot port 72 connected to the primary fluid supply 22 and having its other pilot port 74 connected to the piston and cylinder assembly in communication with the close port 20. The valve 70 has an inlet port 76 connected to valve 30 and an outlet port 78 connected to the pilot of a normally closed pilot actuated hydraulic valve 80.

As best seen in FIG. 2, with the first control valve 30 in the shear ram close position, the primary fluid supply, as indicated by the arrows, is applied to the close port 20 of the piston and cylinder assembly. Once the blowout preventer rams 12 move into and contact the pipe to be sheared, the pressure in the piston and cylinder assembly 15 increases. As a differential pressure between the ports 72 and 74 of the valve 70 approaches zero, the valve 70 opens to supply pressure from its port 78 to the pilot actuated valve 80. Actuation of the pilot valve 80, as best seen in FIG. 3, releases fluid pressure from the dedicated accumulator 50 to apply the pressure to the inlet port 62 of the intensifier 60 to increase the pressure at the intensifier outlet 64 and apply this increased pressure to the close port 20 to cause the blowout preventer 12 to shear the pipe, all as indicated by the arrows. It is to be noted at this point that the check valve 38 moves to the closed position to prevent the higher pressure fluid coming from the pressure intensifier 60 from being lost into the primary fluid circuit of line 22.

In order to open the blowout preventer 12, both of the control valves 30 and 32 must be moved to the ram open position. With the valves 30 and 32 moved to the open position, regulated fluid will flow through valve 32 through the inverse selector valve 40 to the open port 18 and also into the intensifier 60 through line 61 below the piston 66 thereby recocking the intensifier 60. Fluid would also flow out of the closed port 20, into the port 64 of the intensifier and also through check valve 38 (which is held open by pilot line 39), through selector valve 36, through valve 32 and into the reservoir 24. Valves 70 and 80 are thereby de-energized.

Figure 5:
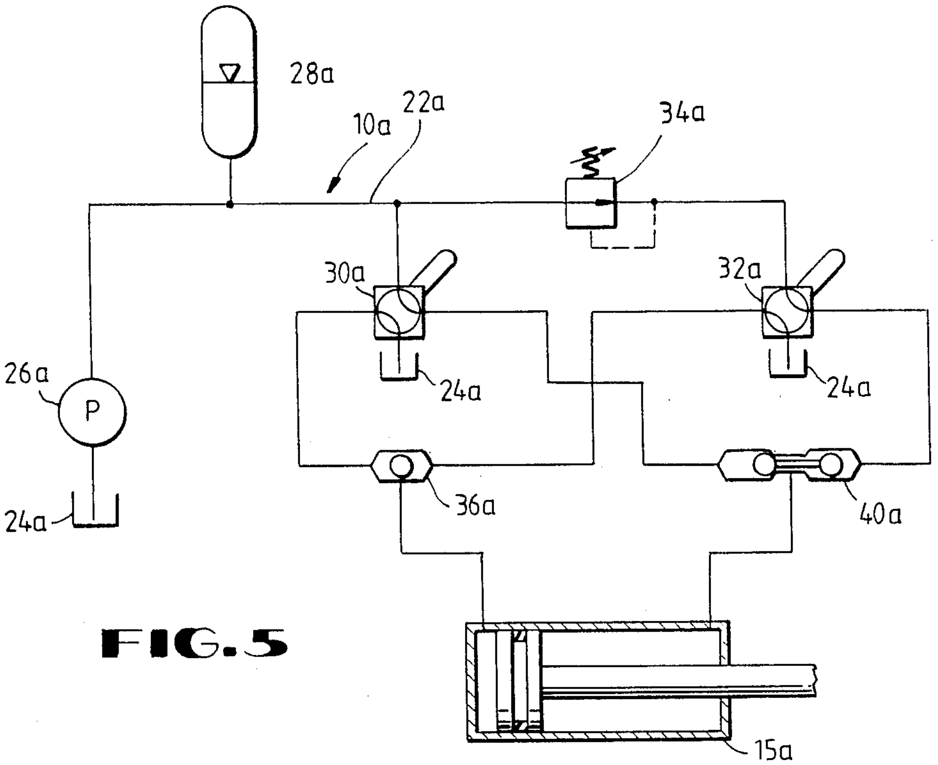
FIG. 5 is a schematic diagram of a control circuit using dual, independently controlled valves for providing dual level, independently controlled fluid supplies.

As previously indicated, the present control circuit 10 includes numerous features which are generally indicated in the control circuit 10 of FIGS. 1–3. However, the individual features may be separately utilized in various control circuits independent of other features for accomplishing advantageous results. Referring now to FIG. 5, a fluid control circuit generally indicated by the reference numeral 10a is shown having a fluid supply 22a, including a fluid reservoir 24a, a pump 26a, and one or more accumulators 28a for supplying control valves 30a and 32a with control fluid for controlling a pressure responsive operator such as a double-acting piston and cylinder assembly 15a. A pressure regulator 34a is connected to the fluid control line 22a upstream of the valve 32a. Thus, the control circuit 10a provides a dual level circuit for operating the piston and cylinder assembly 15a with either a regulated limited pressure by valve 32a or an unregulated higher pressure by valve 30a.

Figure 6:
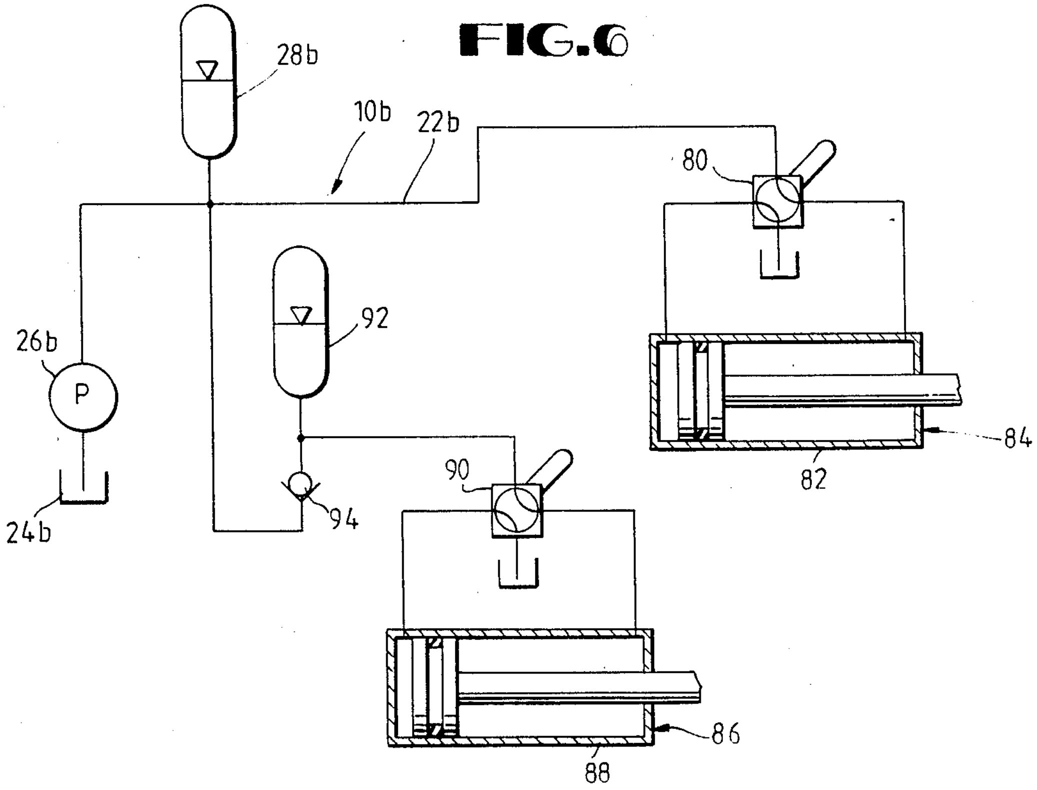
FIG. 6 is a schematic diagram of a control circuit for controlling a plurality of blowout preventers, each of which has a dedicated fluid supply.

FIG. 6 provides a fluid control circuit 10a with a dedicated fluid supply reserve for exclusive use for operating and controlling a specific function or equipment. In this embodiment, a primary fluid supply 22b is provided and including a reservoir 24b, a pump 26b, and one or more accumulators 28b. A control valve 80 is provided for opening and closing the piston and cylinder assembly 82 of one type of equipment or blowout preventer 84. A second piece of critical equipment, such as blowout preventer 86, which is controlled by piston and cylinder assembly 88 from a four-way control valve 90 is supplied from a dedicated fluid supply, such as one or more accumulators 92. The accumulator 92 may be charged from the primary supply line 22b through a check valve 24 or may be charged from an independent and separate fluid source. In any event, a dedicated fluid supply 92 is always available for the exclusive use of the critical blowout preventer 86. While a single critical blowout preventer 86 is shown, other and further blowout preventers may be provided, each of which is connected to and supplied from the outlet of a separate dedicated accumulator which supplies fluid power to a single blowout preventer.

Figure 7:
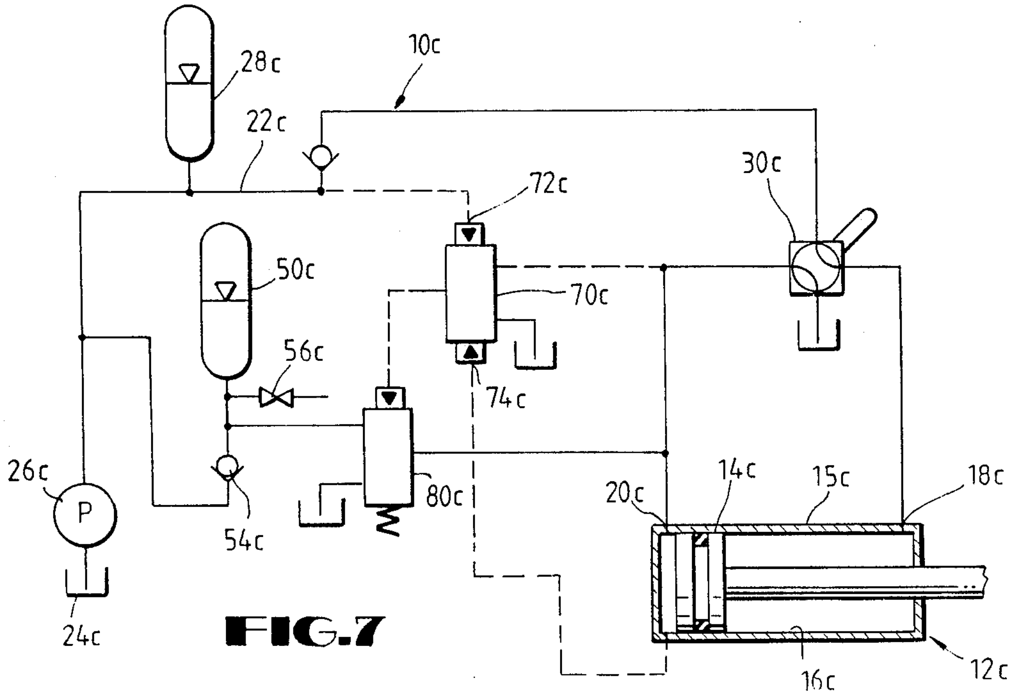
FIG. 7 is a schematic diagram of a control circuit of the present invention utilizing a secondary fluid supply reserved for supplementary use and actuated automatically upon a sensed demand.

Referring now to FIG. 7, another embodiment of the present invention is seen in wherein a control circuit 10c utilizes a dedicated secondary fluid supply for supplemental use which is actuated by automatic means for applying the reserve fluid supply on a sensed operating condition. Again, a blowout preventer 12c is shown having a piston and cylinder assembly 15c controlled by a control valve 30c. When the valve 30c is moved to the close position, fluid from the primary fluid supply 22c is applied to the close port 20c to actuate the blowout preventer 12c in the close position. A dedicated second fluid supply source is provided by the accumulator 50a which may be charged through check valve 54C, or in the alternative, charged to an independent and/or higher pressure source through valve 56c. As long as the primary pressure in the primary fluid control line 22c exceeds pressure at the close port 20c in the cylinder 16c, the pilot valve 70c blocks the access of the pressure in the dedicated accumulator 50c. However, once flow from the primary fluid supply 22c through the valve 30c, through the piston, and cylinder assembly 15c ceases, the pressure in the cylinder 16c becomes substantially equal to the primary pressure in line 22c. Then the differential pressure pilot-operated valve 70c opens to admit pilot pressure to the pilot pressure-operated valve 80c, which in turn opens to connect the reserve fluid pressure in accumulator 50c to the close port 20c. Thus, the control circuit 10c of FIG. 7 holds a dedicated supply of operating energy in reserve until needed, but automatically provides the reserve when it is needed.

Figure 8:
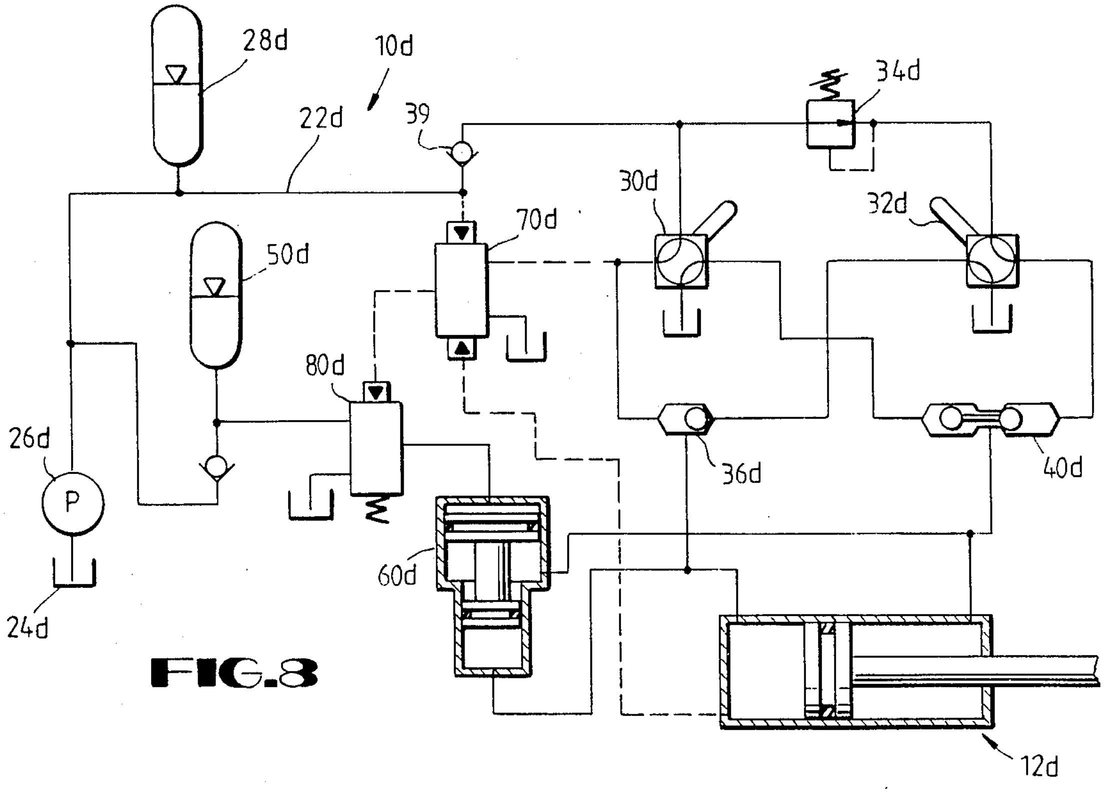
FIG. 8 is a schematic diagram of another embodiment of the present invention.

Referring now to FIG. 8, another embodiment of the present invention is seen in which the control circuit 10d is similar to circuit 10 shown in FIGS. 1-3. However, the pilot operated check valve 38 of FIGS. 1-3 is omitted and replaced with check valve 39 which is connected to the inlet of first control valve 30d. Check valve 39 performs the function of preventing the loss of the high pressure from the secondary fluid supply from the intensifier 60d to the primary supply circuit 22d.

The present invention, therefore, is well adapted to carry out the objects and attain the ends and advantages mentioned as well as others inherent therein. While presently preferred embodiments of the invention have been given for the purpose of disclosure, numerous changes in the details of construction, arrangements of parts, and steps of the method will be apparent to those skilled in the art and which are encompassed within the spirit of the invention and the scope of the appended claims.

What is claimed is:

1. A control circuit for supplying fluids to a pressure responsive valve operator having a double acting piston and cylinder assembly comprising,
   - a fluid supply,
   - a first control valve connected between the fluid supply and both sides of the piston and cylinder assembly,
   - a pressure regulator connected to the fluid supply,
   - a second control valve connected between the pressure regulator and both sides of the piston and cylinder assembly,
   - a first selector check valve connected between one side of the assembly and each of said first and second control valves, and
   - a second selector check valve connected between the second side of the assembly and each of the first and second control valves.

2. A control circuit for supplying fluids to a pressure responsive valve operator comprising,
   - a primary fluid supply,
   - a control valve connected between the primary fluid supply and the valve operator for actuating the valve operator,
   - an accumulator charged with pressurized fluid providing a secondary fluid supply, and
   - valve means connected between the accumulator and said pressure responsive valve operator for supplying the pressurized fluid in the accumulator to the valve operator when the flow of fluid from the primary fluid supply to the valve operator substantially ceases, and
   - said valve means includes a differential pressure pilot operated valve having a first pilot pressure inlet connected to the primary fluid supply and a second pilot pressure inlet connected to the valve operator.

3. A control circuit for supplying fluids to a pressure responsive valve operator having a double acting piston and cylinder assembly comprising,
   - a primary fluid supply,
   - a control valve connected between the fluid supply and both sides of the piston and cylinder assembly,
   - a selector check valve connected between the fluid supply and the control valve,
   - an accumulator charged with pressurized fluid for providing a secondary fluid supply,
   - a differential pressure pilot operated, valve connected between the accumulator and the selector check valve, said valve opening in response to pilot pressure equalization, said valve having a first pilot pressure inlet connected to the fluid supply, and a second pilot pressure inlet connected to one side of the piston and cylinder assembly whereby the differential pilot valve releases fluid from the accumulator when the pressure on the one side of the assembly is equal to the pressure in the fluid supply.

4. A control circuit for supplying fluids to a pressure responsive valve operator having a double acting piston and cylinder assembly comprising, a primary fluid supply, a first control valve connected between the fluid supply and both sides of the piston and cylinder assembly, a pressure regulator connected to the fluid supply, a second control valve connected between the pressure regulator and both sides of the piston and cylinder assembly, an accumulator charged with pressurized fluid for providing a secondary fluid supply, and valve means connected between the accumulator and the valve operator for supplying the pressurized fluid in the accumulator to the valve operator when the pressure on the assembly is equal to the pressure in the fluid supply.

5. The apparatus of claim 4 wherein the fluid in the accumulator is pressurized greater than the pressure of the fluid in the fluid supply.

6. The apparatus of claim 4 wherein the accumulator is connected to and charged with fluid from the fluid supply through a check valve.

7. The apparatus of claim 4 including, a pressure pilot operated check valve connected to one side of the pressure responsive valve operator, and a control line connected between the pilot of the check valve and the second side of the pressure responsive valve operator for opening the check valve in response to pressure on said second side.

8. The apparatus of claim 4 wherein the valve means includes, a differential pressure pilot operated, valve connected between the accumulator and the valve operator, said valve opening in response to pilot pressure equalization, said valve having a first pilot pressure inlet connected to the fluid supply, and a second pilot pressure inlet connected to one side of the piston and cylinder assembly whereby the pilot valve releases fluid from the accumulator when the pressure on the one side of the assembly is equal to the pressure in the fluid supply.

9. A control circuit for supplying fluids to a pressure responsive valve operator having a double acting piston and cylinder assembly comprising, a fluid supply, a first control valve connected between the fluid supply and both sides of the piston and cylinder assembly, a pressure intensifier connected between the fluid supply and one side of the piston and cylinder assembly, and valve means connected between the inlet of the intensifier and one side of the piston for comparing the pressure differential therebetween and for actuating the intensifier for supplying higher pressure fluid to the assembly when the pressure on the one side of the assembly is equal to the pressure in the fluid supply.

10. A control circuit for supplying fluids to a pressure responsive valve operation having a double acting piston and cylinder assembly comprising, a fluid supply, a control valve connected between the fluid supply and both sides of the piston and cylinder assembly, a pressure intensifier having an inlet connected to the control valve and an outlet connected to one side of the piston and cylinder assembly, a selector check valve connected between the outlet and said control valve, and a differential pressure pilot operated valve connected between the intensifier and the control valve, said pilot valve opening in response to pilot pressure equalization, said pilot valve having a first pilot pressure inlet connected to the fluid supply, and a second pilot pressure inlet connected to the one side of the piston and cylinder assembly whereby the differential pilot valve applies pressure to the intensifier inlet when the pressure on the one side of the assembly is equal to the pressure in the fluid supply.

11. A control circuit for supplying fluids to a pressure responsive valve operator having a double action piston and cylinder assembly comprising, primary fluid supply, a control valve connected between the fluid supply and the hydraulic piston and cylinder assembly for moving the operator toward the closed position, a pressure intensifier having an inlet and an outlet, said outlet connected to the hydraulic piston and cylinder assembly, an accumulator having an output connected to the inlet of the intensifier, and valve means between said intensifier inlet and said accumulator for connecting the pressure in the accumulator to the intensifier when the flow rate to the piston and cylinder assembly approaches zero.

12. The apparatus of claim 11 wherein the valve means connects the pressure in the accumulator to the intensifier when the pressure on the piston and cylinder assembly equals the pressure in the fluid supply.

13. The apparatus of claim 11 including, a pressure regulator connected to the fluid supply, and a second control valve connected between the pressure regulator and the hydraulic piston and cylinder assembly actuating the piston and cylinder assembly.

14. The apparatus of claim 11 wherein said valve means includes, a differential pilot operated valve having a high pressure port connected to the fluid supply and a low pressure port connected to piston and cylinder assembly.

15. The apparatus of claim 14 wherein said valve means includes, a pilot operated valve having its pilot connected to the control valve, and having ports connected between the differential pilot operated valve and the intensifier.

16. The apparatus of claim 11 wherein the accumulator is pressurized greater than the pressure of the fluid in the fluid supply.

17. The apparatus of claim 11 wherein the accumulator is connected to and charged with fluid from the fluid supply.

18. The control circuit of claim 13 including, a check valve connected to the inlet of the first control valve, and an inverse selector check valve connected between the second control valve and the hydraulic piston and cylinder assembly.

* * * * *